United States Patent
Saunders (10) Patent No.: US 10,712,443 B2
(45) Date of Patent: *Jul. 14, 2020

(54) NONLINEAR INTERMODULATION DISTANCE DETERMINATION SYSTEM

(71) Applicant: Kitty Hawk Corporation, Palo Alto, CA (US)

(72) Inventor: Christopher Scott Saunders, San Jose, CA (US)

(73) Assignee: Kitty Hawk Corporation, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/663,092

(22) Filed: Oct. 24, 2019

(65) Prior Publication Data

US 2020/0072975 A1 Mar. 5, 2020

Related U.S. Application Data

(63) Continuation of application No. 15/338,084, filed on Oct. 28, 2016, now Pat. No. 10,509,123.

(51) Int. Cl.
| | |
|---|---|
| *G01S 15/46* | (2006.01) |
| *G01S 15/08* | (2006.01) |
| *G05D 1/10* | (2006.01) |
| *G01S 7/524* | (2006.01) |
| *G01S 7/526* | (2006.01) |

(52) U.S. Cl.
CPC .............. *G01S 15/46* (2013.01); *G01S 7/524* (2013.01); *G01S 7/526* (2013.01); *G01S 15/08* (2013.01); *G05D 1/101* (2013.01)

(58) Field of Classification Search
CPC .......... G01S 15/08; G01S 15/46; G01S 7/524; G01S 7/526; G05D 1/101
See application file for complete search history.

(56) References Cited

U.S. PATENT DOCUMENTS

| 3,757,335 | A | * | 9/1973 | Gruenberg | .............. G01S 13/02 |
|---|---|---|---|---|---|
| | | | | | 342/367 |
| 5,206,654 | A | * | 4/1993 | Finkelstein | ............... G01S 1/14 |
| | | | | | 342/410 |
| 5,247,307 | A | * | 9/1993 | Gandar | ................ G06K 9/3241 |
| | | | | | 342/192 |
| 2011/0050530 | A1 | * | 3/2011 | Hnatiw | .................... H01Q 1/28 |
| | | | | | 343/841 |

(Continued)

*Primary Examiner* — Manuel A Rivera Vargas
*Assistant Examiner* — Yaritza H Perez Bermudez
(74) *Attorney, Agent, or Firm* — Van Pelt, Yi & James LLP (57) ABSTRACT

A distance determination system is disclosed. In various embodiments, the system includes a transmitter configured to transmit a first pulse at a first frequency and a second pulse at a second frequency; a receiver configured to receive audio signals; and a processor coupled to the receiver and configured to detect whether an intermodulation product of the first pulse and the second pulse is present and above a threshold amplitude in an audio signal received by the receiver; and determine, based at least in part on whether the intermodulation product of the first pulse and the second pulse is detected to be present and above a threshold amplitude, whether a distance to a surface is greater than a distance corresponding to the first pulse and the second pulse.

20 Claims, 10 Drawing Sheets

(56) References Cited

U.S. PATENT DOCUMENTS

| | | | |
|---|---|---|---|
| 2013/0090874 A1* | 4/2013 | Bishop | G01R 13/02 |
| | | | 702/67 |
| 2014/0237259 A1* | 8/2014 | Karabinis | H04L 9/00 |
| | | | 713/189 |
| 2016/0033630 A1* | 2/2016 | Harvey | G01S 13/781 |
| | | | 342/43 |
| 2016/0274001 A1* | 9/2016 | Parker | G01M 99/007 |
| 2016/0282457 A1* | 9/2016 | Mazzaro | G01S 13/106 |
| 2018/0037320 A1* | 2/2018 | Ko | B64C 39/024 |

* cited by examiner

FIG. 9

NONLINEAR INTERMODULATION DISTANCE DETERMINATION SYSTEM

CROSS REFERENCE TO OTHER APPLICATIONS

This application is a continuation of U.S. patent application Ser. No. 15/338,084, now U.S. Pat. No. 10,509,123, entitled NONLINEAR INTERMODULATION DISTANCE DETERMINATION SYSTEM filed Oct. 28, 2016 which is incorporated herein by reference for all purposes.

BACKGROUND OF THE INVENTION

A vehicle in flight may require a method of determining its effective altitude or distance above a surface. The vehicle may use its altitude information in autopilot calculations or provide the information to a pilot of the vehicle. The vehicle may generate noise distortion. The vehicle may be designed to fly over various terrains.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A distance determination system is disclosed. The distance determination system comprises a transmitter configured to transmit a first pulse at a first frequency and a second pulse at a second frequency. The system further comprises a receiver configured to receive audio signals. The system comprises a processor coupled to the receiver and configured to detect whether an intermodulation product of the first pulse and the second pulse is present in an audio signal received by the receiver and whether the intermodulation product has an amplitude larger than a threshold. Based at least in part on whether the intermodulation product of the first pulse and the second pulse is detected to be present and detected to have an amplitude larger than the threshold, the processor determines whether a distance to a surface is greater than a distance corresponding to the first pulse and the second pulse. In the event an intermodulation product of the first pulse and the second pulse is received and has an amplitude greater than the threshold, the distance to the surface is determined to be greater than a distance corresponding to the first pulse and the second pulse.

In some embodiments, the distance determination system is installed on an aircraft. The system may determine an altitude or approximate altitude of the aircraft based on detecting intermodulation distortion. The distance determination system may determine how far the aircraft is above ground, a body of water, another aircraft, an obstacle, or any other appropriate surface. The distance determination may be used in order to automate flight or control of a vehicle. The distance determination system may send a sequence of multiple pairs of pulses, wherein each pair of pulses tests whether the vehicle is above a surface by greater than a specific distance. The system may increment the distance tested at regular intervals. Based on intermodulation products detected from the multiple pairs of pulses or intermodulation products that are not detected, the aircraft's distance above a surface may be determined.

Figure 1:
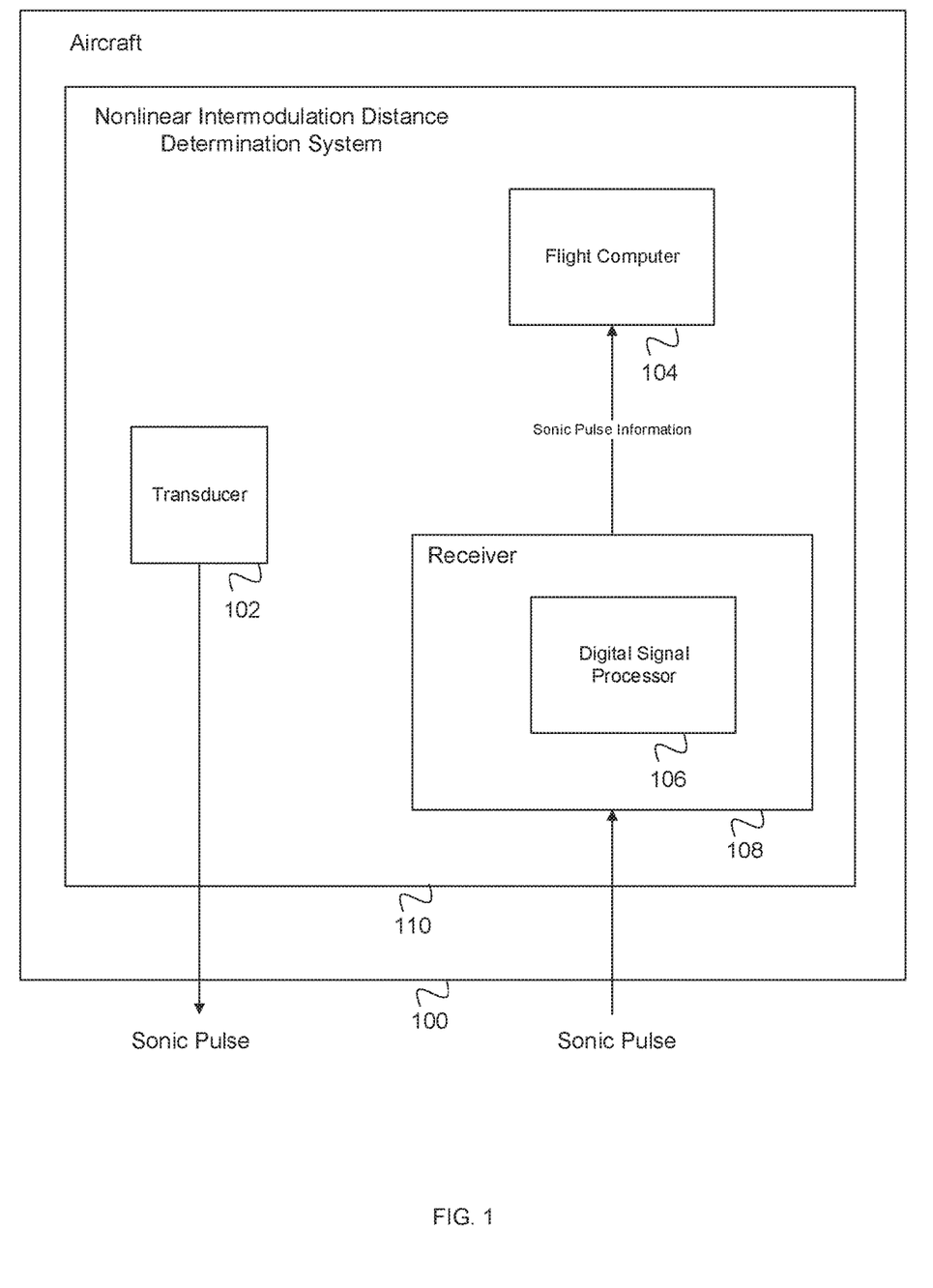
FIG. 1 is a diagram illustrating an embodiment of a nonlinear intermodulation distance determination system.

FIG. 1 is a diagram illustrating an embodiment of a nonlinear intermodulation distance determination system. In some embodiments, the system exploits acoustic reflection. However, the system differs from traditional sonar systems that send a signal and calculate distance based on the amount of time the signal takes to return. In calculating the altitude of an aircraft, traditional sonar systems may be inaccurate. Air below the aircraft may be turbulent. The aircraft may include noisy components such as rotors, which may distort the signal. Turbulence and noise may have a lessor effect on a nonlinear intermodulation distance determination system because the system is binary. In some embodiments, the system is based upon whether or not expected intermodulation distortion products are detected within a predetermined time period. A nonlinear intermodulation distance determination system may be more accurate than a traditional sonar system. Using radar to determine an aircraft's altitude may be cost prohibitive compared to a nonlinear intermodulation distance determination system. A nonlinear intermodulation distance determination system may be optimal for a small form factor multicopter aircraft flown over water.

A nonlinear intermodulation distance determination system may determine an aircraft's altitude by testing whether the aircraft is above a surface (e.g. the ground) by a set distance and incrementing the tested distance. For example, the distance may be tested in 2 feet intervals from 2 to 10 feet. In the event the aircraft is determined to be above the surface by the tested distance or less, a new set of distances may be determined and tested. The new set of distances may have smaller intervals and be based on the results of the first set of tested distances. The system may test distances in increasing order. For example, a first set of distances may comprise 1 meter, 2 meters, 3 meters, 4 meters, and 5 meters. In the event intermodulation products are detected when two pulses corresponding to a distance of 2 meters are transmitted and intermodulation products are not detected when two pulses corresponding to a distance of 3 meters are transmitted, the system may determine a new set of distances comprising 2.2 meters, 2.4 meters, 2.6 meters, and 2.8 meters. The system may iterate until it reaches a desired specificity of altitude. The degree of specificity may be determined by a pilot, a manufacturer, or any appropriate party. In some embodiments, the system iterates within predetermined time constraints in order to provide an up-to-date value on its distance from the surface.

In some embodiments, the surface must have a minimum detected surface area or other attributes in order to qualify as a surface. The system may comprise sensors. For example, a stray piece of paper underneath the system may not be detected as a surface whereas a large lake is. In some embodiments, minor objects do not affect the system due to the system's integration of signals over time. For example, a floating piece of debris may briefly block transmission of an intermodulation product to a receiver. However, a brief blip in received signals may be insignificant over the time period considered. Digital signal processing may filter out irregular signals.

In the example shown, aircraft 100 includes nonlinear intermodulation distance determination system 110. System 110 comprises transducer 102, flight computer 104, and receiver 108. Transducer 102 sends out a sonic pulse. In some embodiments, the sonic pulse is not audible to humans. Transducer 102 may be strong, lightweight, or have low power requirements. The transducer may simultaneously transmit two sonic pulses at different frequencies. The two sonic pulses may create third-order distortion products when sound waves of the pulses meet. In the event the two sonic pulses hit a surface (e.g. the ground or a body of water) before the pulses meet, third-order distortion products will not occur or will not reach receiver 108. Reflection and dissipation may ruin the intermodulation distortion products. In some embodiments, intermodulation distortion products are created but are weak. Received intermodulation distortion products below a threshold magnitude may be considered as noise. Receiver 108 detects sonic pulses. Digital signal processor 106 processes received sonic pulses. For example, digital signal processor 106 may perform operations on the pulses, integrate pulses over time, send indication in the event a specific frequency is detected, or perform any other appropriate action. Sonic pulse information is sent from receiver 108 to flight computer 104. The sonic pulse information may comprise a result of processing performed by digital signal processor 106. The sonic pulse information may comprise an indication that distortion nor intermodulation products were received for certain pairs of pulses whereas intermodulation products were not received for other pairs of pulses. Flight computer 104 may interpret the sonic pulse information to determine aircraft 100's distance above a surface or a range of distances. Flight computer 104 may interpret the sonic pulse information to determine the aircraft's altitude or distance above a surface.

Figure 2:
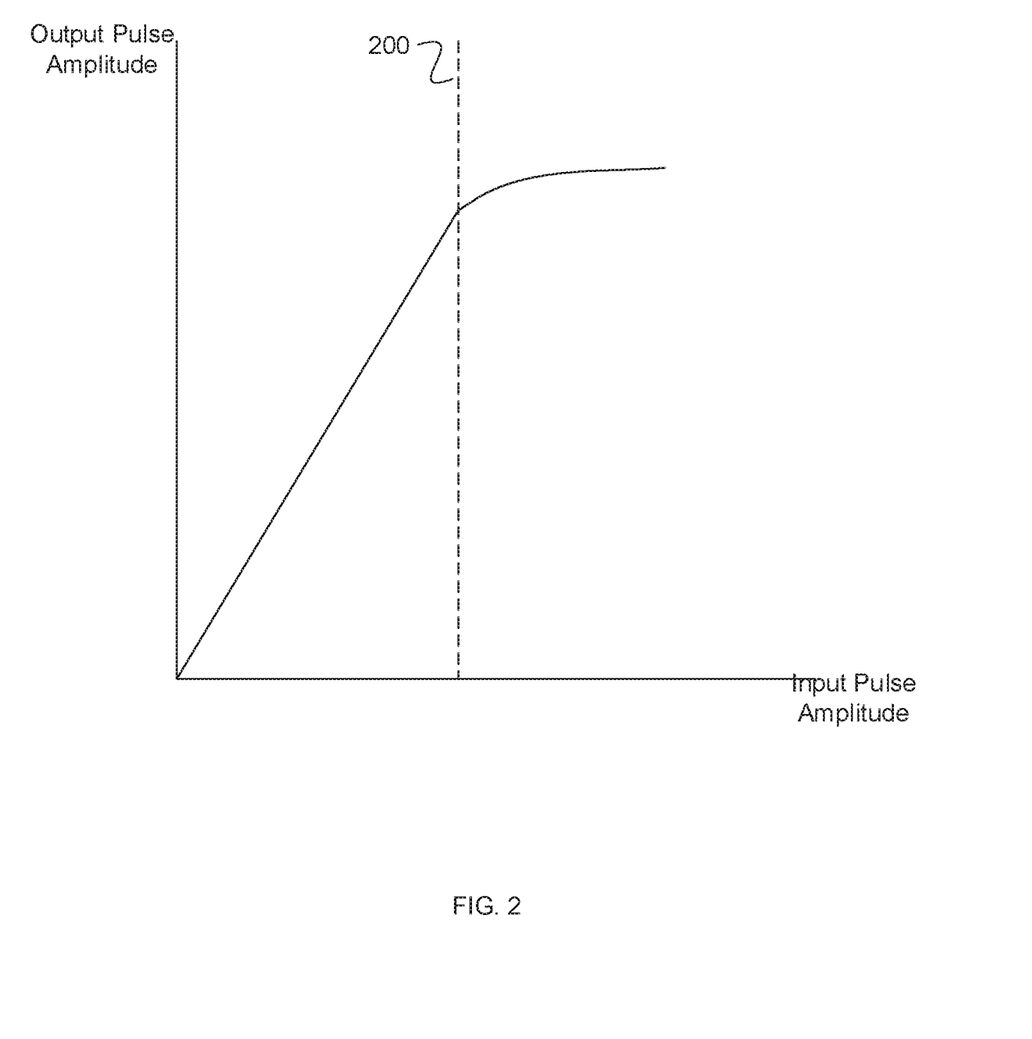
FIG. 2 is a diagram illustrating an embodiment of a nonlinear system.

FIG. 2 is a diagram illustrating an embodiment of a nonlinear system. In the graph shown, a resultant output pulse amplitude is shown based on an input pulse amplitude. The graph shows an example of amplitude distortion. At an input pulse frequency below amplitude 200 as shown, the relationship between the input pulse amplitude and output pulse amplitude is linear. In the linear region, harmonics may not be produced when an input pulse is transmitted. At amplitudes above amplitude 200, the relationship is nonlinear and harmonics are produced. Intermodulation distortion products may not be generated in the event harmonics are not generated. A single pulse may create multiple harmonics when driven through a nonlinear medium. In some embodiments, the graph shown describes a relationship between an input pulse and an output pulse when the input pulse is transmitted through air. Air may behave linearly at certain amplitudes and frequencies and behave nonlinearly when a pulse is driven at a high amplitude or frequency. Any type of nonlinear distortion may produce harmonics.

Figure 3A:
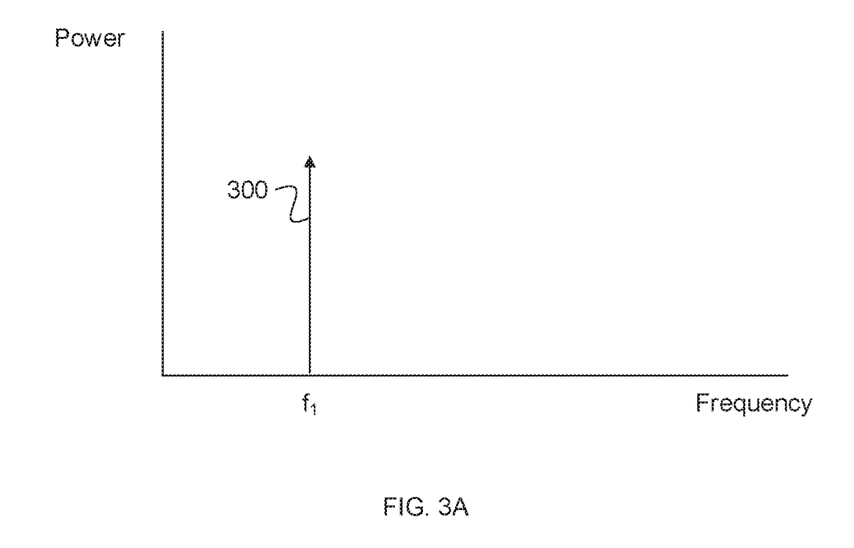
FIG. 3A is a diagram illustrating an embodiment of a pulse.

FIG. 3A is a diagram illustrating an embodiment of a pulse. In the example shown, pulse 300 is produced at frequency $f_1$. In some embodiments, pulse 300 is sent through a linear medium. The pulse does not produce harmonics and no distortion occurs. In some embodiments, pulse 300 resides on the linear portion of the function shown in FIG. 2.

Figure 3B:
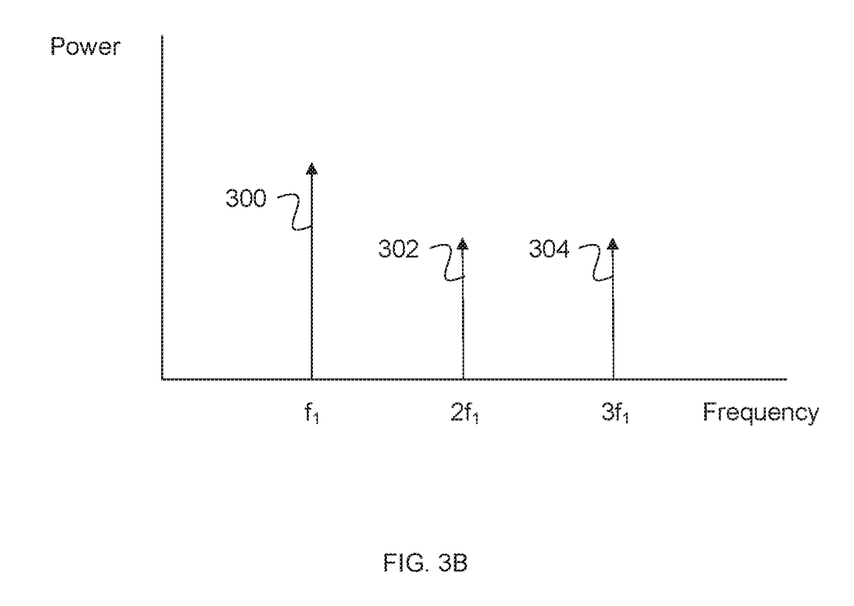
FIG. 3B is a diagram illustrating an embodiment of harmonics.

FIG. 3B is a diagram illustrating an embodiment of harmonics. In the example shown, pulse 300 is produced at frequency $f_1$ and resultant harmonics are produced. Harmonic pulses 302 and 304 are at frequencies $2f_1$ and $3f_1$. Additional harmonics may be produced at multiples of pulse 300. In some embodiments, pulse 300 was driven through air and harmonics 302 and 304 are produced as a result of acoustic nonlinear properties of air. In some embodiments, the nonlinear intermodulation distance determination system exploits the frequency based property of generating harmonics.

Figure 4A:
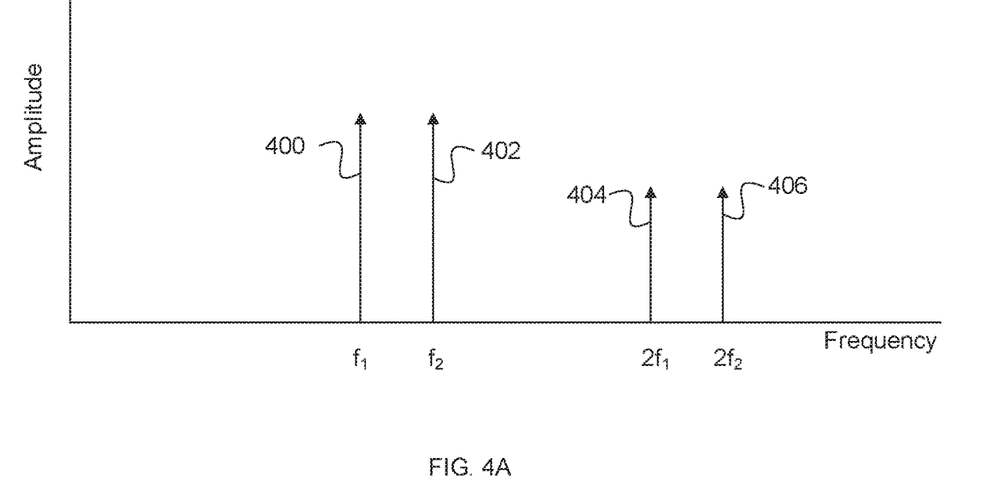
FIG. 4A is a diagram illustrating an embodiment of pulses and harmonics.

FIG. 4A is a diagram illustrating an embodiment of pulses and harmonics. In the example shown, pulse 400 is at frequency $f_1$. Pulse 402 is at frequency $f_2$. Pulses 400 and 402 may be produced in a nonlinear medium, causing the pulses to create harmonics. Pulse 404 is at frequency $2f_1$ and is a harmonic of pulse 400. Pulse 406 is at frequency $2f_2$ and is a harmonic of pulse 402. Pulses 400 and 402 are transmitted at the same amplitude. Pulses 404 and 406 have smaller amplitudes than pulses 400 and 402. Harmonics that occur as a result of an original pulse may have a smaller amplitude.

Figure 4B:
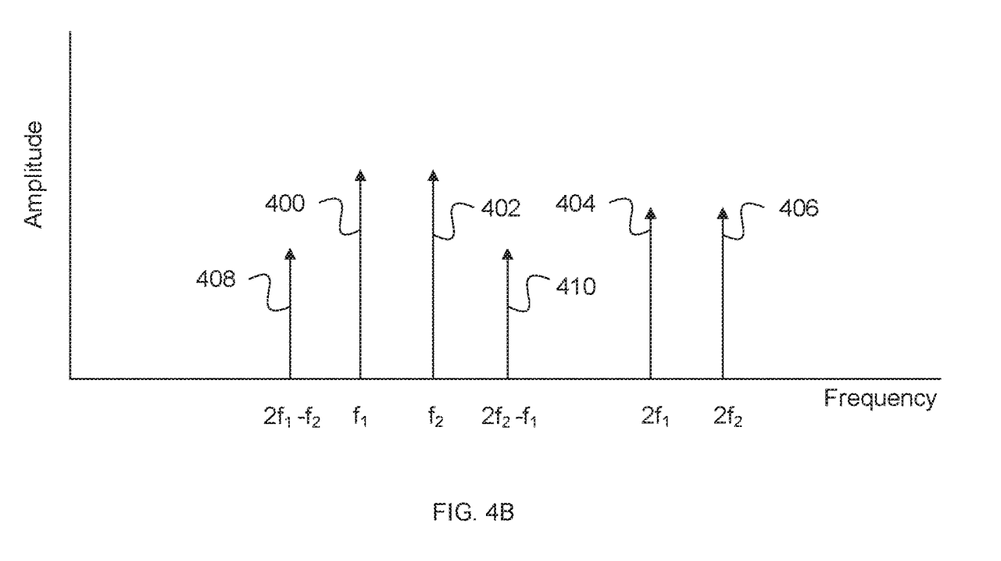
FIG. 4B is a diagram illustrating an embodiment of intermodulation.

FIG. 4B is a diagram illustrating an embodiment of intermodulation. In the example shown, pulses 400 and 402 are at frequencies $f_1$ and $f_2$ respectively. Pulses 404 and 406 are at frequencies $2f_1$ and $2f_2$ and are second harmonics of pulses 400 and 402 respectively. Pulses 404 and 406 are second-order distortion products. Pulse 408 occurs at a frequency of $2f_1-f_2$ and pulse 410 occurs at frequency $2f_2-f_1$. Pulses 408 and 410 occur due to a combination of the original transmitted pulses of 400 and 402 with second-order distortion products pulses 404 and 406. Pulses 408 and 410 are third-order distortion products. The occurrence of third-order distortion products may indicate that the pulse 400 and pulse 402 met and combined. Amplitudes of the third-order distortion products may be smaller than the amplitudes of second-order distortion products.

Figure 5:
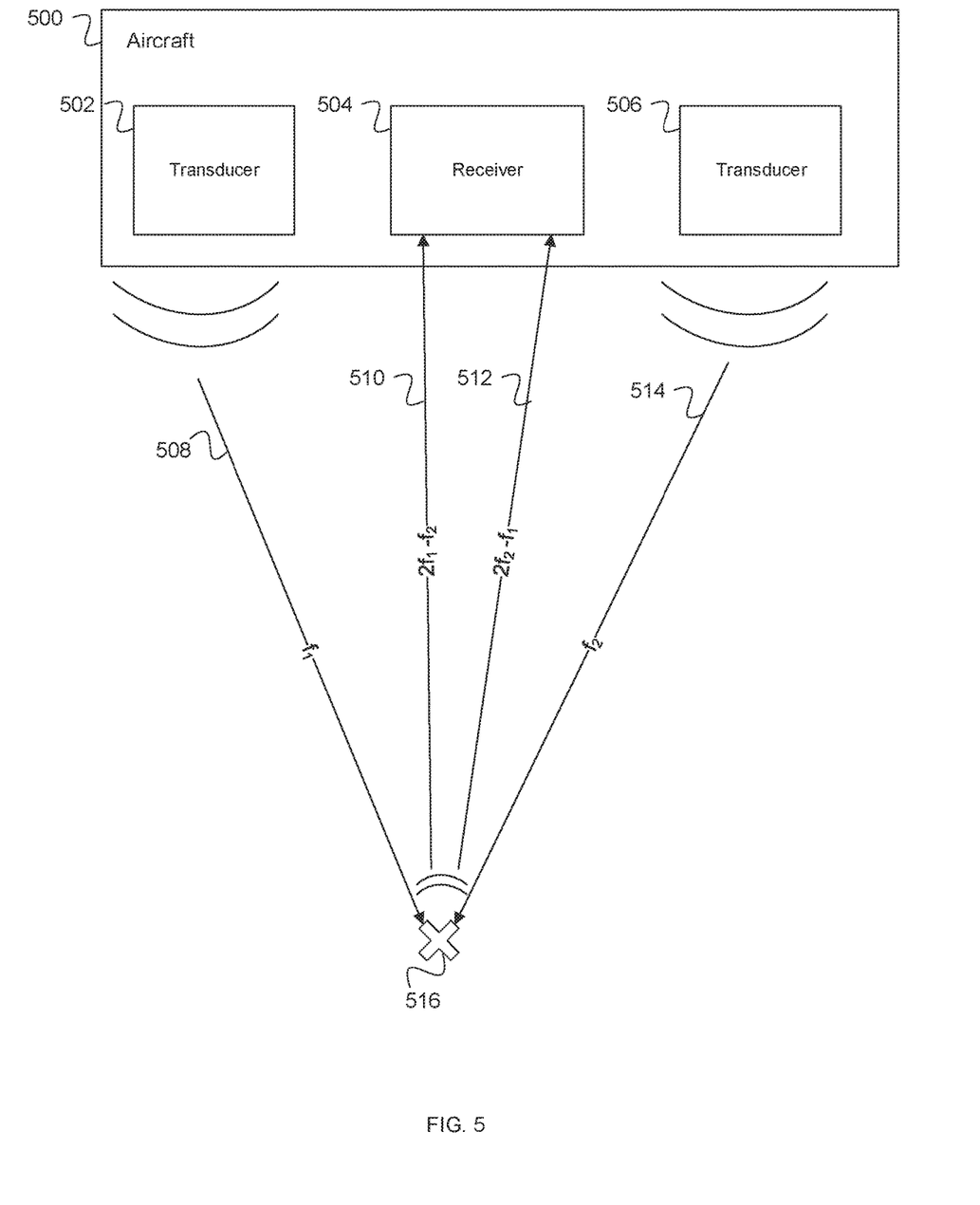
FIG. 5 is a diagram illustrating an embodiment of a nonlinear intermodulation distance determination system.

FIG. 5 is a diagram illustrating an embodiment of a nonlinear intermodulation distance determination system. In the example shown, aircraft 500 includes transducer 502, receiver 504, and transducer 506. Transducer 502 transmits pulse 508 at frequency $f_1$. In various embodiments, the aircraft has multiple transducers placed in different locations on the aircraft, a single transducer that transmits pulses from various locations, or a transducer that transmits pulses with a degree of directionality. In some embodiments, the receiver and transducers are level on the aircraft. In some embodiments, the receiver and transducers are not level. A receiver may be positioned below an underside of the aircraft in order to receive signals where they are stronger. For example, the receiver may be placed on an extrusion that extends below the aircraft. In some embodiments, the receiver is placed such that transmitted pulse intersection points are near and below the receiver.

In some embodiments, phased array transducers are used. For example, multiple transducers may be used to send directional signals. The transducers may send signals with delays such that constructive and destructive interference result in a focused, directional signal. The number of transducers used may be based on weight, cost, form-factor, or directionality requirements.

A flight computer of the aircraft may perform calculations to account for positions of the receiver and transducers in determining the aircraft's distance from a surface. The receiver or multiple receivers may be placed based on expected directionality of lobes of intermodulation distortion. Directionality of lobes of intermodulation distortion may be affected by the directionality of transmitted pulses.

Transducer 506 transmits pulse 514 at frequency $f_2$. The frequencies of pulses 508 and 514 may be different. The two pulses may create multiple intermodulation products in the event they intersect. Pulses 508 and 514 may be transmitted simultaneously. Pulses 508 and 514 meet at point 516. In some embodiments, pulses 508 and 514 generate harmonics. Lower and higher level harmonics of the pulses may mix to generate intermodulation distortion. Intermodulation distortion products may be propagate from point of intersection 516. Intermodulation distortion products pulse 510 and pulse 512 propagate up to aircraft 500 wherein they are detected via receiver 504. Pulse 510 and 512 occur at frequencies of $2f_1-f_2$ and $2f_2-f_1$ respectively. Intermodulation products may comprise combinations of the original frequencies and their harmonics.

Receiver 504 may integrate audio signals over a period of time. The receiver may be designed to be sensitive in order to detect intermodulation distortion in the event it exists. The pair of pulses transmitted may correspond to a certain specific distance below the vehicle that the transducer and receiver are attached to. In the example shown, point 516 is at a distance below aircraft 500 that corresponds to pulses 508 and 514. The pair of pulses may be transmitted to test whether a vehicle is above ground by more than the corresponding distance. For example, in the event that point 516 is 5 meters below aircraft 500, pulses 508 and 514 are transmitted to determine whether the aircraft is greater than 5 meters above terrain (e.g. above ground, above the ocean, above a lake, etc.). In the event the distance to the surface is less than the distance corresponding to the first pulse and the second pulse, the two pulses intersect with the surface before they can mix. In some embodiments, the pulses are dispersed, absorbed, or scattered and do not come in contact with each other. Minor intermodulation distortion may be generated. In the event the distance to the surface is equal to the distance corresponding to the pair of pulses, intermodulation distortion may be generated but as a result of contact with the surface, the intermodulation products generated may not be propagated to the receiver. In some embodiments, multiple pairs of that correspond to different distances are transmitted sequentially.

In some embodiments, in the event the two pulses intersect with the surface, intermodulation products are created. The intermodulation products may be created from the two pulses reflecting off of the surface. The intermodulation products may have a smaller amplitude than intermodulation products created as a result of the pulses intersecting above the surface in the event the surface is absorptive. The system may perform digitally process signals received in order to filter out intermodulation products that result from pulses that initially intersect with the surface. For example, intermodulation products that are below a threshold amplitude may be ignored.

Figure 6A:
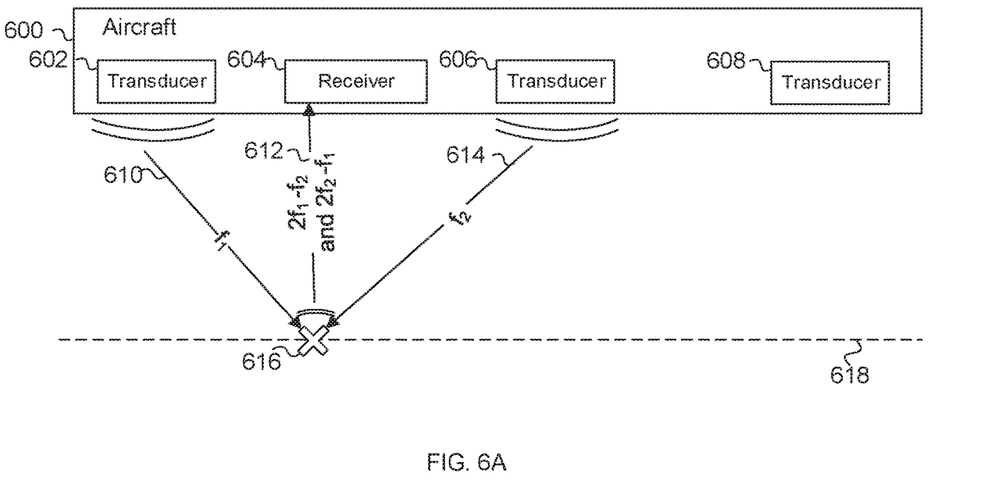
FIG. 6A is a diagram illustrating an embodiment of a nonlinear intermodulation distance determination system used to test if the aircraft is above a first distance.

FIG. 6A is a diagram illustrating an embodiment of a nonlinear intermodulation distance determination system used to test if the aircraft is above a first distance. In the example shown, aircraft 600 includes transducer 602, receiver 604, transducer 606, and transducer 608. Transducers 602 and 606 transmit pulses 610 and 614 at frequencies $f_1$ and $f_2$. Pulses 610 and 614 intersect at point 616 and create intermodulation product 612. Intermodulation product 612 comprises two pulses at frequencies $2f_1-f_2$ and $2f_2-f_1$. Intermodulation product 612 is received by receiver 604. Aircraft 600 is determined to be above the surface by a distance greater than distance 618. Distance 618 as shown is the distance from the bottom of aircraft 600 to the point where pulses 610 and 614 intersect. In some embodiments, the distance corresponding to the first pulse and the second pulse is determined based on locations and angles from which the first pulse and the second pulse are transmitted. In some embodiments, in the event the distance to the surface is determined to be greater than the distance corresponding to the first pulse and the second pulse, the transducer further transmits two pulses corresponding to a distance further than the distance corresponding to the first pulse and the second pulse. The system may transmit a pair of pulses and wait a predetermined period of time. In the event specific intermodulation products corresponding to the pair of pulses is detected in the period of time, two pulses corresponding to a further distance may be transmitted.

Figure 6B:
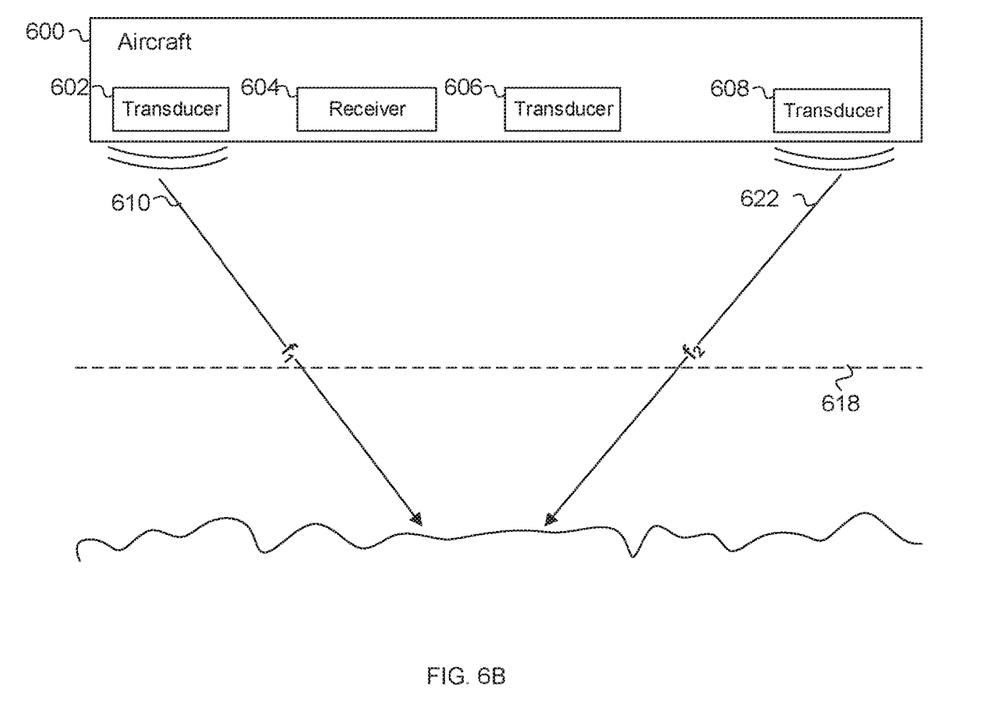
FIG. 6B is a diagram illustrating an embodiment of a nonlinear intermodulation distance determination system used to test if the aircraft is above a second distance.

FIG. 6B is a diagram illustrating an embodiment of a nonlinear intermodulation distance determination system used to test if the aircraft is above a second distance. In the example shown, transducer 602 and transducer 608 transmit pulses 610 and 622 simultaneously. Transducer 606 is not used to transmit a signal. Pulses 610 and 622 correspond to a distance larger than distance 618. The pulses meet the ground before they are able to intersect. No intermodulation distortion is generated. Harmonics of the two pulses may be present. Receiver 604 does not detect intermodulation distortion that would result from pulses 610 and 622 within the predetermined detection period. Pulse 610 is at frequency $f_1$ and pulse 622 is at frequency $f_2$. In some embodiments, while the two frequencies of two pulses transmitted simultaneously differ, each pair of transmitted pulses have the same two frequencies. The pulses may be transmitted with a degree of directionality, be transmitted from varying locations, or be transmitted from varying angles.

Figure 6C:
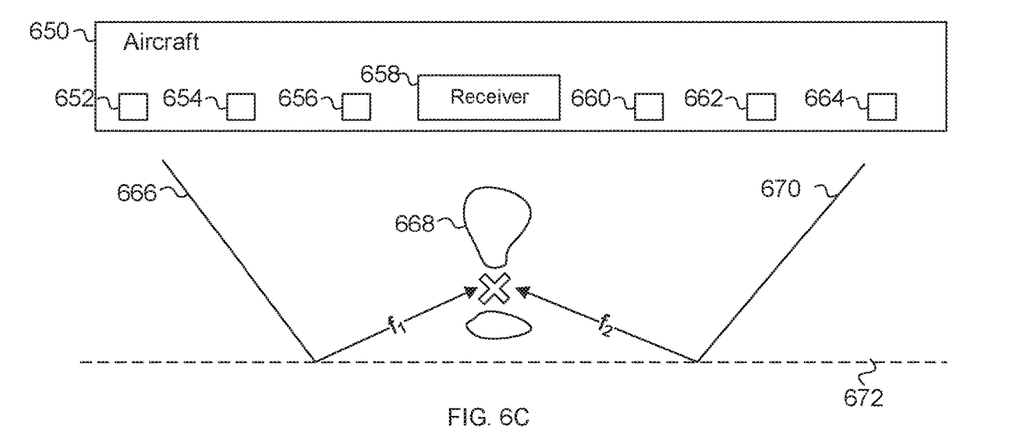
FIG. 6C is a diagram illustrating an embodiment of a nonlinear intermodulation distance determination system in an amplitude-based process.

FIG. 6C is a diagram illustrating an embodiment of a nonlinear intermodulation distance determination system in an amplitude-based process. An amplitude-based process may be used to account for varying surface types. In the example shown, aircraft 650 comprises transducers 652, 654, 656, 6560, 662, and 664. The transducers are aligned as an array and are used to transmit signal 666 at frequency $f_1$ and signal 670 at frequency $f_2$. In the example shown, signals 666 and 670 intersect with surface 672 before they can intersect with each other. Surface 672 as shown is reflective. Surfaces may vary in their absorptive or reflective qualities. For example, concrete may be more reflective than grass. In the example shown, signals 666 and 670 reflect off of surface 672 and intersect above the surface. Lobe 668 shows an example of the resultant lobe created. The majority of the intermodulation products may be directed upwards towards receiver 658 of the aircraft whereas some of the intermodulation products propagate elsewhere. The shape and directionality of lobe 668 may be based on the directionality of signals 666 and 670 at a time of intersection.

Figure 6D:
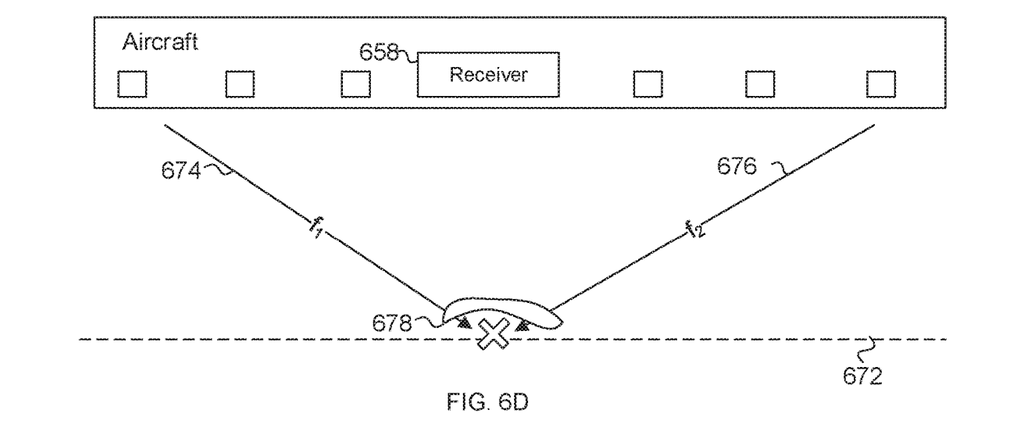
FIG. 6D is a diagram illustrating an embodiment of a nonlinear intermodulation distance determination system in an amplitude-based process.

FIG. 6D is a diagram illustrating an embodiment of a nonlinear intermodulation distance determination system in an amplitude-based process. In the example shown, signals 674 and 676 are transmitted via phase arrayed transducers. The signals intersect with each other at the same point where they intersect with surface 672. Resultant lobe of intermodulation products 678 as shown is smaller and less directionally focused than lobe 668 of FIG. 6C. Some intermodulation products may be created. The amplitude of the intermodulation products may be smaller than intermodulation products created in FIG. 6C. Receiver 658 may not detect the intermodulation products or the detected intermodulation products may be determined to be insignificant.

Figure 6E:
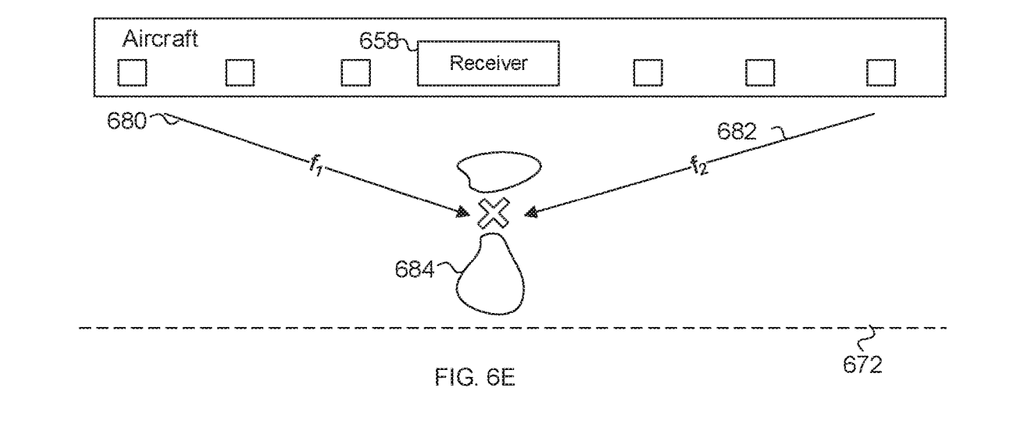
FIG. 6E is a diagram illustrating an embodiment of a nonlinear intermodulation distance determination system in an amplitude-based process.

FIG. 6E is a diagram illustrating an embodiment of a nonlinear intermodulation distance determination system in an amplitude-based process. In the example shown, phase arrayed transducers are used to transmit signals 680 and 682. Signals 680 and 682 are transmitted at shallower angles than signals transmitted in FIG. 6C and FIG. 6D. The signals intersect above surface 672. Lobe 684 shows an example of a resultant lobe. The majority of the intermodulation products created are directed downwards, with some intermodulation products propagated upwards towards receiver 658.

In some embodiments, the nonlinear intermodulation distance determination system tracks the amplitude of intermodulation products detected while sweeping angles of transmitted signals. Captured amplitudes may be analyzed to determine how far the aircraft is from the surface. The amplitudes may be charted or graphed and a shape of the diagram analyzed. A minimum of collected amplitudes may provide insightful information.

For example, amplitudes of intermodulation products received when transmitted signals intersect after reflecting off the surface may be large. In FIG. 6C, the lobe of intermodulation products is directed upwards at the receiver. When a shallower angle is tested and the signals intersect with the surface, amplitudes of intermodulation products received may be very low. In FIG. 6D, the lobe is very small. Most of the transmitted signals and intermodulation products may be dispersed. When an even shallower angle is tested, transmitted signals may intersect above the surface. In FIG. 6E, the lobe is larger than the lobe created in FIG. 6D, but is directed downwards. Detected intermodulation signals at the receiver may be smaller in amplitude than in FIG. 6C but larger than in FIG. 6D. A distance between the surface and the aircraft may be determined to be the same as a distance corresponding to two transmitted pulses that resulted in intermodulation products with the lowest amplitudes.

In the event the system is used in an amplitude-based process on a highly absorptive surface, detected amplitudes may be very low while sweeping the angle of transmitted signals from steep angles to a shallow angles until transmitted signals intersect above the surface. An expected pattern may vary based on the surface present. Recording amplitudes of intermodulation products received may reveal significant information on the aircraft's altitude or position. Each discrete recorded signal, including amplitude information, may be an average signal based on signals received over a predetermined time period. Each recorded signal may be processed.

Sweeping angles and detecting the relative amplitudes of intermodulation products may be more efficient or accurate than traditional radar methods. Traditionally, signal propagation delay is recorded to determine distance from a surface. Determining distance information based on relative amplitudes of signals may require less calibration than a system based on absolute measurements.

Figure 7:
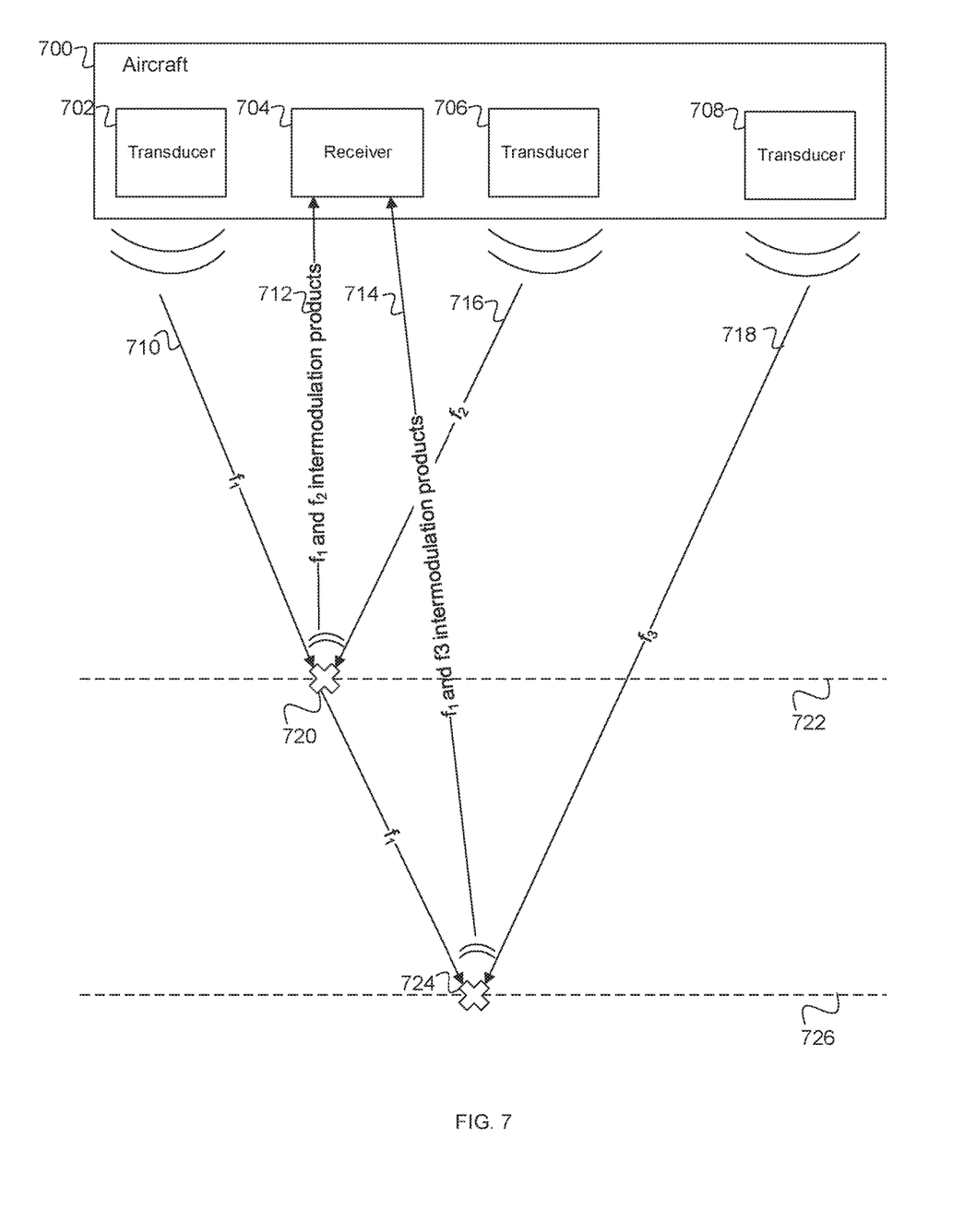
FIG. 7 is a diagram illustrating an embodiment of a nonlinear intermodulation distance determination system sensing multiple intermodulation products simultaneously.

FIG. 7 is a diagram illustrating an embodiment of a nonlinear intermodulation distance determination system sensing multiple intermodulation products simultaneously. In some embodiments, rather than transmitting a pair of pulses simultaneously, a third pulse is also transmitted at the same time as the first and second pulses. The first pulse and the third pulse may correspond to a distance different from the distance corresponding to the first pulse and the second pulse. The receiver may be configured to determine a distance to a surface based at least in part on whether the intermodulation product of the first pulse and the second pulse or an intermodulation product of the first pulse and the third pulse is detected.

In the example shown, aircraft 700 includes transducer 702, receiver 704, transducer 706, and transducer 708. Transducer 702 transmits pulse 710, transducer 706 transmits pulse 716, and transducer 708 transmits pulse 718. All pulses are emitted simultaneously. Pulse 710 and pulse 716 combine at point 720. Pulse 710 and pulse 716 intersect at distance 722 below aircraft 700. Pulse 710 is at frequency $f_1$ and pulse 716 is at frequency $f_2$. Intermodulation products generated due to $f_1$ and $f_2$ are received by receiver 704. Sound waves at frequency $f_1$ intersect with pulse 718 at point 724. Point 724 is at distance 726 below aircraft 700. Receiver 704 receives intermodulation products generated by $f_1$ and $f_2$. The aircraft may be determined to be above a surface by a distance greater than distance 726.

In some embodiments, three or more pulses are transmitted simultaneously and a distance from a surface is determined for an object based on whether intermodulation products are detected. A map may be created of possible intermodulation products resulting from the signals. In some embodiments, the three or more pulses are at differing frequencies. The frequencies of the pulses may be spaced out such that intermodulation products of various pairs of the three or more pulses do not overlap. The pulse frequencies may be spaced out at various intervals. For example, a frequency difference between a first pulse and a second pulse may not be equal to a frequency difference between the second pulse and a third pulse. Transmitting three or more pulses simultaneously may allow the system to calculate a rough altitude of the object in a shorter period of time than transmitting pairs of pulses sequentially.

Figure 8:
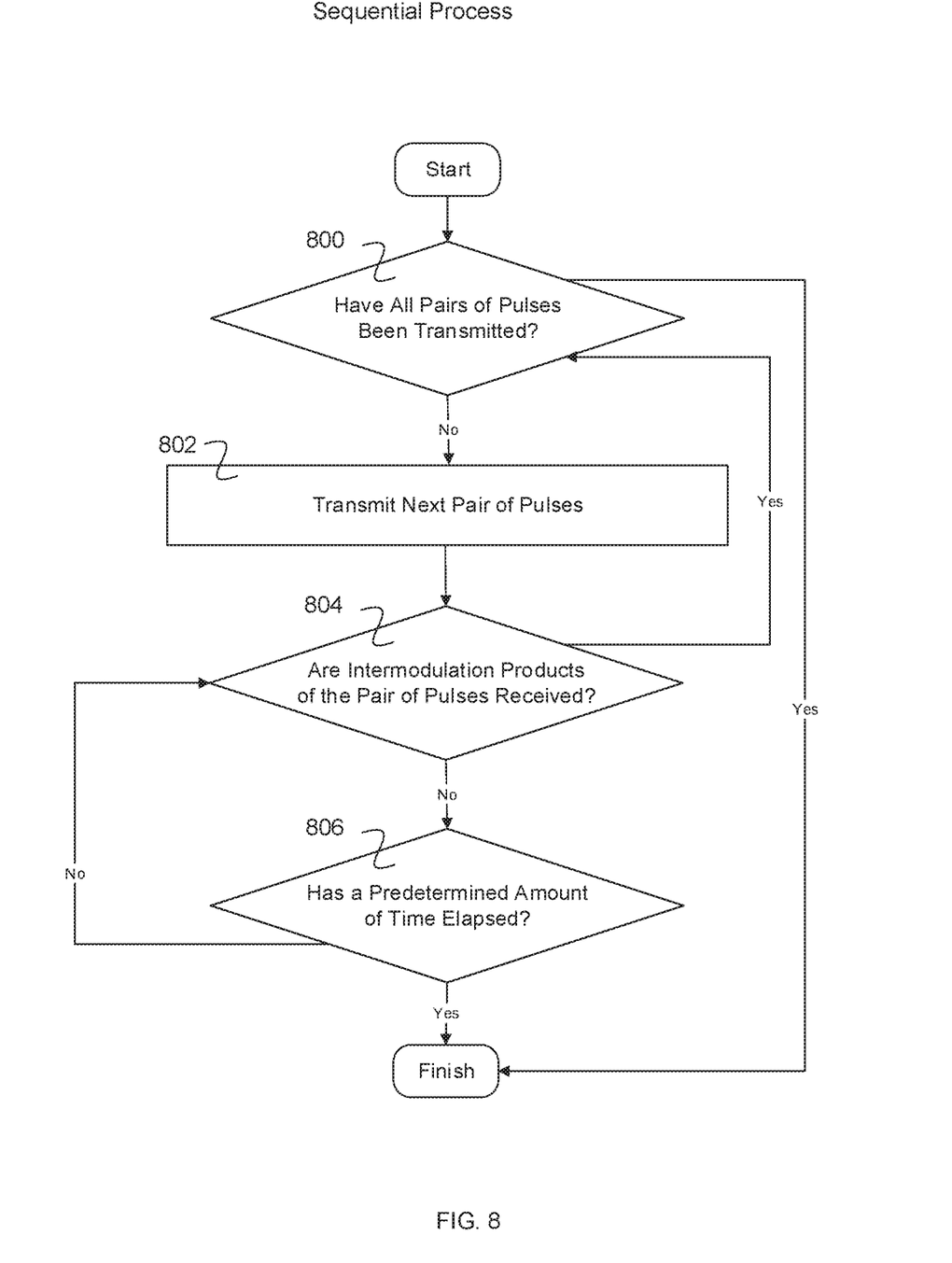
FIG. 8 is a flow diagram illustration an embodiments of a sequential process of a nonlinear intermodulation distance determination system.

FIG. 8 is a flow diagram illustration an embodiments of a sequential process of a nonlinear intermodulation distance determination system. In 800, it is determined whether all pairs of pulses have been transmitted. In the event not all pairs of pulses have been transmitted, in 802 the next pair of pulses is transmitted. For example, a system may have a predetermined list of pulses, wherein the pulses differ in frequency, placement, directionality, or any other factor. The system may sequentially first transmit a first pulse of the list of pulses at the same time as a second pulse. A next pair may comprise the first pulse and a third pulse. In some embodiments, the system has a predetermined sequence of pairs of pulses to test. In 804, it is determined whether intermodulation products of the pair of pulses is received. For example, if a first pulse and a second pulse are transmitted, the system determines whether expected intermodulation products of the first pulse and the second pulse based on their frequencies are detected. In the event the intermodulation products are received, the process returns to 800. The system may iterate over the pairs of pulses until expected intermodulation products are not detected within the predetermined amount of time. The absence of expected intermodulation products may signify that an object or vehicle is above a surface by a distance less than a distance corresponding to the pair of pulses. In the event the intermodulation products are not received, in 806 it is determined whether a predetermined amount of time has elapsed. The predetermined amount of time may be a time limit such as 100 milliseconds. In the event that the predetermined amount of time has not elapsed, the process returns to 804. In the event that the predetermined amount of time has elapsed, the process is finished. In the event that all pairs of pulses have been transmitted, the process is finished.

In some embodiments, in the event that all pairs of pulses have been transmitted and all pairs of pulses resulted in detected intermodulation products, a new set of pairs of pulses is determined. The new set may comprise pairs of pulses corresponding to distances that are greater than distances corresponding to the first tested set of pulses. In some embodiments, in the event expected intermodulation products are not received, the system will determine a new set of pairs of pulses. The new set of pulses may be based on the distance at which intermodulation products were not received. The sequential process may be executed on the new set of pairs of pulses in order to determine more accurately how far above the surface the object or vehicle is.

Figure 9:
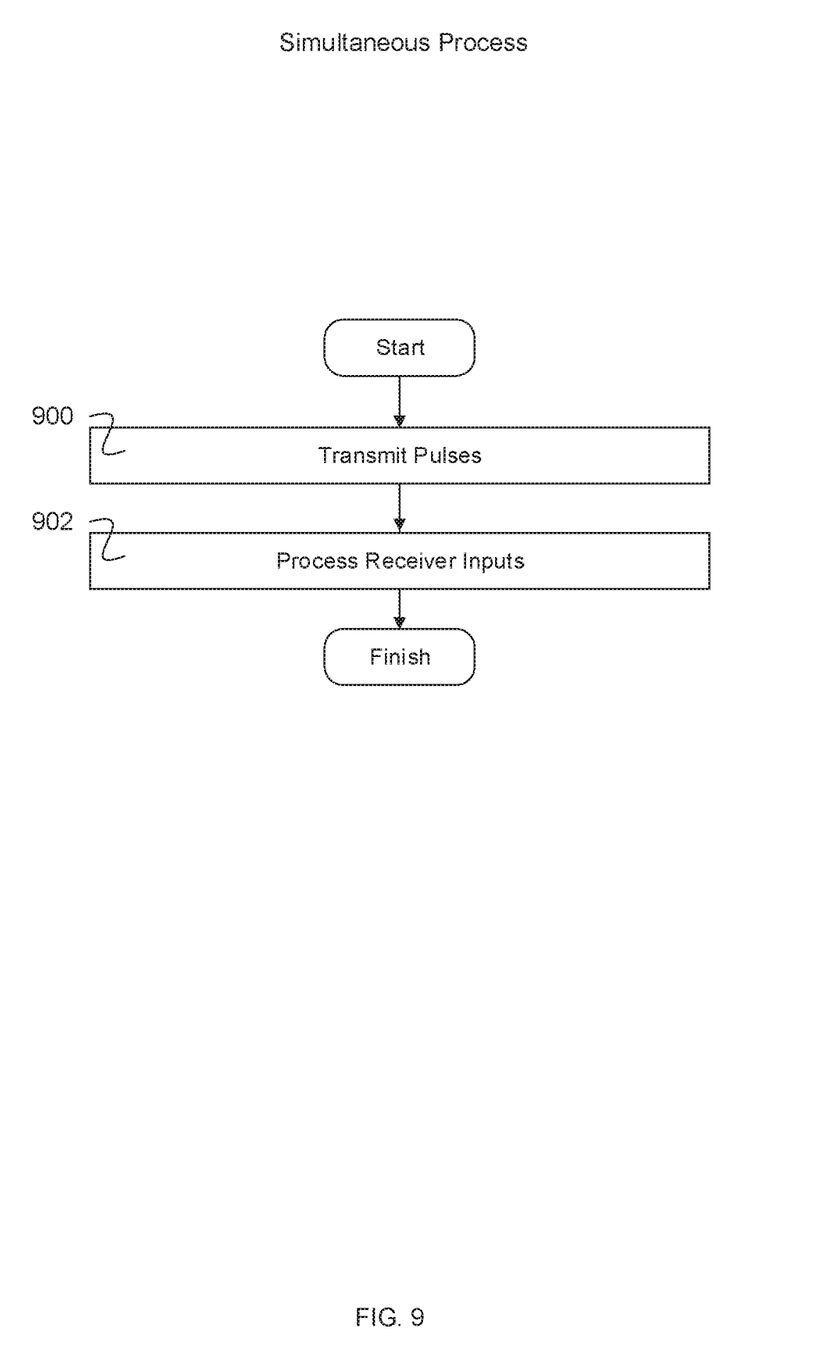
FIG. 9 is a flow diagram illustration an embodiments of a simultaneous process of a nonlinear intermodulation distance determination system.

FIG. 9 is a flow diagram illustration an embodiments of a simultaneous process of a nonlinear intermodulation distance determination system. In 900, pulses are transmitted. For example, multiple pulses may be transmitted that result in various intermodulation products. In 902, receiver inputs are processed. The inputs may be processed to determine which intermodulation products are present, if any, and which intermodulation products are absent. The receiver may be triggered to cease operations in the event that an intermodulation product corresponding to the greatest tested distance is received. In the event an intermodulation product corresponding to the greatest tested distance is received, the system may determine a new set of pulses to test that correspond to greater distances.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A distance determination system comprising:
   a transmitter configured to transmit a pair of pulses formed by a first pulse at a first frequency and a second pulse at a second frequency, wherein the pair of pulses has a corresponding distance associated therewith;
   a receiver configured to receive audio signals; and
   a processor coupled to the receiver and configured to:
   detect whether an intermodulation product of the first pulse and the second pulse is present and above a threshold amplitude in an audio signal received by the receiver; and
   determine, based at least in part on whether the intermodulation product of the first pulse and the second pulse is detected to be present and above a threshold amplitude, whether a distance to a surface removed from the transmitter is greater than the distance with which the pair of pulses is associated.

2. The system of claim 1, wherein the distance to the surface is determined to be greater than the distance corresponding to the first pulse and the second pulse in the event the intermodulation product of the first pulse and the second pulse is detected and above a threshold amplitude within a period of time following the transmission of the first pulse and the second pulse.

3. The system of claim 1, wherein in the event the intermodulation product is not received and above a threshold amplitude within a period of time following the transmission of the first pulse and the second pulse, the distance to the surface is determined to be equal to or less than the distance corresponding to the first pulse and the second pulse.

4. The system of claim 1, wherein the first pulse and the second pulse create multiple intermodulation products in the event they intersect.

5. The system of claim 1, wherein the first frequency is different from the second frequency.

6. The system of claim 1, wherein the distance corresponding to the first pulse and the second pulse comprises a distance at which the first pulse and the second pulse intersect and create the intermodulation product.

7. The system of claim 1, wherein the distance corresponding to the first pulse and the second pulse is determined based on locations and angles from which the first pulse and the second pulse are transmitted.

8. The system of claim 1, wherein the first pulse and the second pulse are transmitted with a degree of directionality.

9. The system of claim 1, wherein in the transmitter and the receiver are situated on an aircraft.

10. The system of claim 1, wherein the receiver integrates the audio signals over a period of time.

11. The system of claim 1, wherein in the event the distance to the surface is determined to be greater than the distance corresponding to the first pulse and the second pulse, the transmitter further transmits two pulses corresponding to a distance further than the distance corresponding to the first pulse and the second pulse.

12. The system of claim 1, wherein multiple pairs of pulses that correspond to different distances are transmitted sequentially.

13. The system of claim 1, wherein multiple pairs of pulses that correspond to different distances are transmitted sequentially, wherein the pairs of pulses correspond to increasingly greater distances until an intermodulation product of a transmitted pair is failed to be detected and above a threshold amplitude within a period of time after transmission.

14. The system of claim 13, wherein the multiple pairs of pulses each comprise a pulse at the first frequency and a pulse at the second frequency, wherein the pulse at the second frequency is transmitted from varying locations or angles.

15. The system of claim 1, wherein the transmitter is configured to transmit a third pulse at a third frequency at the same time as the first pulse and the second pulse, wherein the first pulse and the third pulse correspond to a distance different from the distance corresponding to the first pulse and the second pulse.

16. The system of claim 15, wherein the receiver is configured to determine a distance to the surface based at least in part on whether the intermodulation product of the first pulse and the second pulse or an intermodulation product of the first pulse and the third pulse is detected and above a threshold amplitude.

17. The system of claim 13, wherein amplitudes of intermodulation products received after each pair of the multiple pairs of pulses are transmitted sequentially are recorded.

18. The system of claim 17, wherein the amplitudes of intermodulation products are used to determine the distance to the surface.

19. A method, comprising:
transmitting a pair of pulses formed by a first pulse at a first frequency and a second pulse at a second frequency, wherein the pair of pulses has a corresponding distance associated therewith;
receiving audio signals;
detecting whether an intermodulation product of the first pulse and the second pulse is present and above a threshold amplitude in an audio signal received by the receiver; and
determining, based at least in part on whether the intermodulation product of the first pulse and the second pulse is detected to be present and above a threshold amplitude, whether a distance to a surface removed from a transmitter is greater than the distance with which the pair of pulses is associated.

20. A computer program product embodied in a non-transitory computer readable storage medium and comprising computer instructions for:
transmitting a pair of pulses formed by a first pulse at a first frequency and a second pulse at a second frequency, wherein the pair of pulses has a corresponding distance associated therewith;
receiving audio signals;
detecting whether an intermodulation product of the first pulse and the second pulse is present and above a threshold amplitude in an audio signal received by the receiver; and
determining, based at least in part on whether the intermodulation product of the first pulse and the second pulse is detected to be present and above a threshold amplitude, whether a distance to a surface removed from a transmitter is greater than the distance with which the pair of pulses is associated.

* * * * *